United States Patent [19]
Ikegami

[11] 3,812,530
[45] May 21, 1974

[54] MAGNETIC RECORDING APPLIANCE WITH CONTROL FOR TRANSFERRING DESIRED INFORMATION FROM AN ENDLESS TAPE

[75] Inventor: Yoshizo Ikegami, Amagasaki, Japan

[73] Assignee: Konan Camera Research Institute, Kobe, Japan

[22] Filed: Dec. 18, 1972

[21] Appl. No.: 315,831

[52] U.S. Cl. ........................ 360/5, 179/100.1 DR

[51] Int. Cl. .................. G11b 15/02, G11b 15/18, G11b 27/08

[58] Field of Search ........... 179/100.2 S, 100.2 B, 179/100.2 E, 100.2 MD, 100.1 VC, 179/100.1 DR; 178/6.6 A; 35/35 C

[56] References Cited

UNITED STATES PATENTS

| | | | |
|---|---|---|---|
| 2,918,524 | 12/1959 | Hume | 178/6.6 A |
| 3,703,041 | 11/1972 | Kohtani | 179/100.2 S |
| 3,702,506 | 11/1972 | Goshima et al. | 35/35 C |
| 3,703,774 | 11/1972 | Goshima | 179/100.2 S |
| 3,028,454 | 4/1962 | Kohorn | 179/100.2 B |
| 3,701,860 | 10/1972 | Iwawaki | 179/100.2 E |
| 3,711,654 | 1/1973 | Yoshikawa | 179/100.2 S |

*Primary Examiner*—Stanley M. Urynowicz, Jr.
*Assistant Examiner*—Alfred H. Eddleman
*Attorney, Agent, or Firm*—Wenderoth, Lind & Ponack

[57] ABSTRACT

A magnetic recording appliance for use in combination with a tape recorder which is provided with a remote-control terminal for receiving remote-control signals for starting and stopping the recording operation and with a signal-input terminal for receiving signals to be recorded is disclosed. The recording appliance includes an endless magnetic recording tape which has a specified length and a drive system for driving the speed upon which said tape is operatively mounted. A magnetic recording head for magnetically recording a signal onto said endless magnetic recording tape and positioned to contact said tape, a magnetic erasing head positioned to contact said tape for erasing the recorded signal from said magnetic recording tape and a magnetic reproducing head which is arranged to reproduce the signal recorded on said magnetic recording tape are also provided. The reproducing head contacts the tape at a position ahead of the recording head in a recording track of the tape in order to reproduce the signal recorded on the tape a specified time period after the signal has been recorded. An output terminal is coupled to the magnetic reproducing head whereby the signal reproduced by the magnetic reproducing head may be applied to the signal-input terminal of the tape recorder. The reproducing head, erasing head and said recording head are arranged along the running path of the endless tape in such order that the endless tape passes first on the reproducing head, second on the erasing head and finally on the recording head. A delayed-reset timer is operatively connected to the tape recorder remote-control terminal for controlling the starting and stopping of a recording operation in the tape recorder which timer produces the remote-control signal upon activation whereby the tape recorder commences recording and ceases generating the remote-control signal after a preset delay time from a resetting of the switching, thus stopping the tape recorder.

2 Claims, 1 Drawing Figure

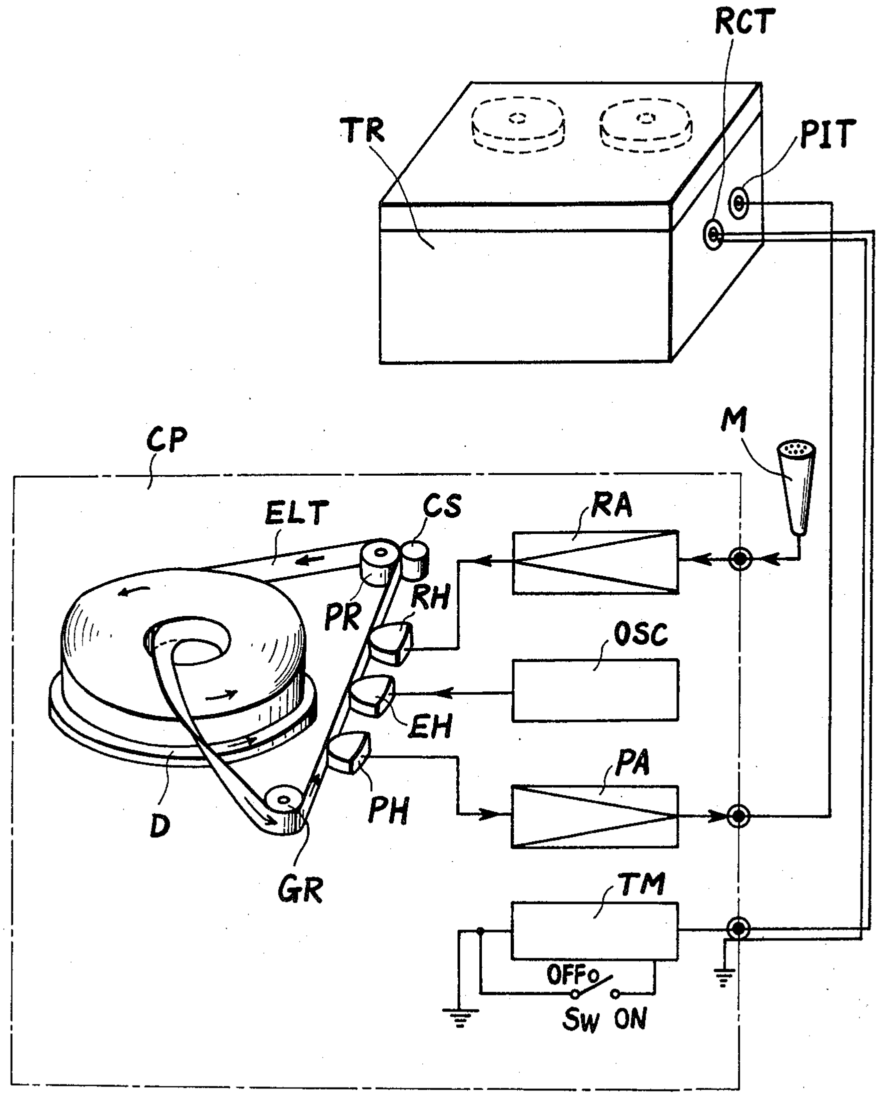
RCT
TR
PIT
M
CP
ELT
CS
RA
PR
RH
OSC
EH
PA
D
PH
GR
TM
OFF
SW
ON

MAGNETIC RECORDING APPLIANCE WITH CONTROL FOR TRANSFERRING DESIRED INFORMATION FROM AN ENDLESS TAPE

BACKGROUND OF THE INVENTION

It is usual when recording a conference proceeding or a telephone conversation with a magnetic recorder to stop the machine while unnecessary parts of the proceeding or conversation are going on, and to restart the machine as soon as the proceeding or conversation is directed toward important matter. In such practice, however, when the important sustance is recognized and immediately recorded into the machine, it is usually too late to record the beginning of such important material, thereby often rendering the recorded passage contextually incomprehensive. Therefore, for the purpose of completely recording necessary passages, it has been a general practice to run a magnetic recorder for the duration of a conference or conversation, including apparently discernible superfluous passages. However, when reproducing such an overall record, it would be very toilsome and difficult to strain out important parts out of the lengthy passages.

SUMMARY OF THE INVENTION

The magnetic recording appliance of the present invention overcomes the abovementioned drawback by providing a recording appliance which, if switched on whenever a passage of speech or conversation is found worth recording or necessary to be recorded, is capable of tracing back such speech or conversation for a specified period of time before, and of recording it.

BRIEF DESCRIPTION OF THE DRAWING

The attached drawing is a block diagram of a magnetic recording appliance embodying this invention.

DETAILED DESCRIPTION OF THE INVENTION

The device of this invention will be described in detail as follows, referring to an example shown by the drawing, wherein an ordinary tape recorder TR comprises a known remote-control terminal RCT for controlling the stopping and restarting of the movement of the tape recorder TR, by opening and closing a circuit of the terminal or by supplying a specified voltage between them. PIT indicates a signal input terminal for receiving an input signal for recording.

CP represents in this example an appliance which is separate from a tape recorder. This appliance CP comprises a reel of endless tape ELT placed on a known rotary disc D, a capstan CS for driving said endless tape ELT, in a forward direction, a pinch roller PR, a guide roller GR, a recording head RH, an erasing head EH and a reproducing head PH.

The reproducing head PH, erasing head EH and recording head RH are arranged in the recited order along the running path of the endless tape ELT.

An output of a microphone M is amplified by a known record amplifier RA and converted into a record signal which is given to said recording head RH. An erasing signal from an oscillator OSC is applied to said erasing head EH. A sound signal recorded in a track on said endless tape ELT by said recording head RH is reproduced by said reproducing head PH after a specified interval, and is amplified by a reproduction amplifier PA, and is finally applied to the input terminal PIT of the tape recorder TR. A timer TM provided in the appliance CP is a known delayed-reset type timer which issues a remote control signal to immediately actuate the tape recorder TR when a switch SW is closed (namely, is switched to start recording) and terminates the remote control signal to stop its movement at a specified delay period from an opening (namely, a resetting) the switch SW.

Next the movement of this appliance will be explained. As is well known, the endless tape ELT traverse the route at a period of, for instance, 30 seconds, 1 minutes, 5 minutes or 10 minutes, the time period specifically depending upon the length and running speed of the tape. Therefore, a record signal on the endless tape ELT is erased every time it passes by the erasing head EH. Then the recording head RH supplies the newly erased endless tape ELT with the next record signal which is produced from a sound signal coming through a signal source such as the microphone M and amplified and treated in a known manner with necessary peaking by the recording amplifier RA, thus recording the sound signal on the endless tape ELT. Consequently, a sound signal is continuously recorded on the endless tap ELT, and the recorded signal of almost one tape-rotation earlier, for instance, nearly ½, 1, 5 or 10 minutes before, is reproduced at the reproducing head PH, which is positioned ahead of the erasing head EH and the recording head RH in the direction of rotation of the endless head. This signal is amplified and treated by the reproduction amplifier PA, and becomes a sound input signal delayed for a specified period after an input signal of the sound source, for instance, the microphone M, and is applied to the signal input terminal PIT of the tape recorder TR, and is recorded on the tape thereof. Therefore, during the course of a conference or conversation, if a conversation currently going on is found to be of importance, the switch SW is pressed to impart a remote control signal from the delayed-open timer TM to the remote control terminals RCT of the tape recorder TR. Then the tape recorder TR is actuated to record the sound signal issued during a specified period, for instance, ½, 1, 5 or 10 minutes, prior to the closing of the switch SW. And when the recording becomes unnecessary and the switch SW is opened (namely, reset), a remote control signal is imparted to the remote control terminals RCT of the tape recorder TR with a delay of the abovementioned period and stops the recording movement of the tape recorder TR. In this manner, the sound signal up to the moment desired by the user can be surely recorded.

Since the tape recorder TR may be constituted to start or stop recording in accordance with the remote control signals of either on or off, as well as off or on, the output of the delayed-reset timer TM should be suitably selected on/off or off/on for start/stop of recording, respectively.

Since the appliance of this invention, with a simple constitution, enables the user to record the signal generated since a specified period priot to the moment he operates the switch SW, it is very suitable and convenient for the recording of conference proceedings as well as of information to police offices, telephone exchanges, various control stations, and so on.

In the foregoing example, the appliance CP is used as an attachment to the tape recorder TR having the remote control terminal. Likewise, this appliance can be used in combination with any tape recorder of the ordinary type fitted with such remote control terminals. Therefore, this appliance is not only expedient, but comes out to be relatively economical.

Besides the abovementioned example, it is also possible to combine the appliance CP and the tape recorder TR into one unit with direct control on the motor by means of the timer TM.

Furthermore, it is recommeded, in case of a need, to fit the appliance CP with an endless tape device embodying a plural number of record reproducing systems varying from each other in the intervals between the recording and the reproduction, for instance, ½, 1, 5, 10 and 20 minutes, so that one of such intervals can be selected to suit the circumstances, with the timer interlocked to such interval change-over device.

I claim:

1. A magnetic recording appliance for use in combination with a tape recorder which is provided with a remote-control terminal for receiving remote-control signals for starting and stopping the recording operation and with a signal-input terminal for receiving signals to be recorded, the recording appliance comprising:

an endless magnetic recording tape which has a specified length;

means to drive said tape at a predetermined speed upon which means said tape is operatively mounted;

a magnetic recording head for magnetically recording a signal onto said endless magnetic recording tape and positioned to contact said tape;

a magnetic erasing head positioned to contact said tape for erasing the recorded signal from said magnetic recording tape;

a magnetic reproducing head which is arranged to reproduce the signal recorded on said magnetic recording tape, the reproducing head touching the tape at a position ahead of said recording head in a recording track of the tape in order to reproduce the signal recorded on the tape a specified time period after the signal has been recorded;

an outupt terminal coupled to said magnetic reproducing head whereby the signal reproduced by said magnetic reproducing head may be applied to said signal-input terminal of the tape recorder;

said reproducing, erasing and recording heads being arranged along the running path of the endless tape in such order that the endless tape passes first on said reproducing head, second on said erasing head finally on said recording head; and a delayed-reset timer operatively connected to said tape recorder remote control terminal for controlling the starting and stopping of a recording operation in said tape recorder which timer produces said remote-control signal upon activation whereby said tape recorder commences recording and ceases generating said remote-control signal after a preset delay time from a resetting of the switching, thus stopping the tape recorder.

2. The magnetic recording appliance of claim 1, wherein said delayed-reset timer issues a remote control signal for starting the recording action of the tape recorder immediately when the switch is switched to an appropriate position and issues a reverse remote control signal for stopping the recording action of the tape recorder a predetermined time period after the setting of said switch, and said predetermined time period is substantially the same as the period of time which elapses as the tape traverses the route between the recording head and the reproducing head of the appliance.

* * * * *